United States Patent
Ryu et al.

(10) Patent No.: US 9,989,144 B2
(45) Date of Patent: Jun. 5, 2018

(54) MOTOR COUPLING DEVICE

(71) Applicant: Hyundai Motor Company, Seoul (KR)

(72) Inventors: Sangmo Ryu, Busan (KR); Myunggyu Kim, Seoul (KR); Hong Seok Yang, Gyeonggi-do (KR); Jungwoo Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 319 days.

(21) Appl. No.: 14/749,229

(22) Filed: Jun. 24, 2015

(65) Prior Publication Data

US 2016/0377171 A1   Dec. 29, 2016

(30) Foreign Application Priority Data

Dec. 3, 2014  (KR) .................. 10-2014-0172126

(51) Int. Cl.
*F16H 55/18* (2006.01)
*F16H 57/12* (2006.01)

(52) U.S. Cl.
CPC ............. *F16H 57/12* (2013.01); *F16H 55/18* (2013.01); *F16H 2057/126* (2013.01); *Y10T 74/19902* (2015.01)

(58) Field of Classification Search
CPC ............... F16F 15/123; F16F 15/12306; F16F 15/12353; F16H 55/18; F16H 57/12; F16H 2057/126; F16H 2057/127; Y10T 74/19628; Y10T 74/19902
USPC ..... 464/66.1, 68.1, 68.4, 68.41; 74/409, 440
See application file for complete search history.

(56) References Cited

U.S. PATENT DOCUMENTS

| | | | | |
|---|---|---|---|---|
| 2,310,232 A | * | 2/1943 | Hale | F16H 55/24 74/440 |
| 3,359,819 A | * | 12/1967 | Veillette | F16H 55/18 464/68.1 |
| 3,365,973 A | * | 1/1968 | Henden | F16H 55/18 74/409 |
| 3,626,778 A | * | 12/1971 | Holmes | F16D 3/02 192/53.1 |
| 5,117,959 A | * | 6/1992 | Graton | F16F 15/1238 192/213.22 |
| 5,890,576 A | * | 4/1999 | Imanaka | F16F 15/1203 192/204 |
| 5,979,259 A | * | 11/1999 | Shook | F16H 55/18 123/90.31 |
| 7,735,927 B2 | | 6/2010 | Lindsay | |

(Continued)

FOREIGN PATENT DOCUMENTS

DE   102011016147 A1 * 10/2012 ............. F16H 55/18
DE   102011122138 A1 *  6/2013 ............. F16H 55/18

(Continued)

*Primary Examiner* — Josh Skroupa
(74) *Attorney, Agent, or Firm* — Mintz Levin Cohn Ferris Glovsky and Popeo, P.C.; Peter F. Corless

(57) ABSTRACT

A motor coupling device for connecting a drivetrain of a hybrid vehicle to a motor and transferring a driving torque of the motor to the drivetrain, the motor coupling device comprising: a coupling plate connected to a rotation shaft of the motor and engaging with a connecting plate of the drivetrain; and a first backlash compensation unit installed at one surface of the coupling plate, interfering with the connecting plate, and compensating for backlash when a motor reverse torque is generated.

12 Claims, 10 Drawing Sheets

(56) References Cited

U.S. PATENT DOCUMENTS

| | | | |
|---|---|---|---|
| 8,011,266 B2* | 9/2011 | Brackney | F16H 55/18 |
| | | | 74/440 |
| 8,111,469 B2* | 2/2012 | Takamatsu | F16H 55/18 |
| | | | 359/696 |
| 8,695,449 B2* | 4/2014 | Lang | F16H 55/14 |
| | | | 74/409 |
| 9,664,251 B2* | 5/2017 | Harby | F16F 15/161 |
| 2004/0200302 A1 | 10/2004 | Kampichler et al. | |
| 2013/0228029 A1* | 9/2013 | Murphy | F16H 55/18 |
| | | | 74/443 |
| 2015/0198205 A1* | 7/2015 | Van Lieshout | F16D 3/10 |
| | | | 74/445 |
| 2015/0316136 A1* | 11/2015 | Schnolzer | F16H 55/18 |
| | | | 74/409 |
| 2016/0033030 A1* | 2/2016 | Palfai | F16H 57/12 |
| | | | 74/409 |

FOREIGN PATENT DOCUMENTS

| | | | |
|---|---|---|---|
| JP | H11-182574 A | | 7/1999 |
| JP | 2000-346180 A | | 12/2000 |
| JP | 201319481 A | * 9/2013 | ............ F16H 55/18 |
| KR | 10-2008-0011486 A | | 2/2008 |
| KR | 10-2012-0078847 A | | 7/2012 |
| KR | 2013-0065419 A | | 6/2013 |
| KR | 2014-0039328 A | | 4/2014 |
| WO | 2013/068689 A1 | | 5/2013 |

\* cited by examiner

MOTOR COUPLING DEVICE

CROSS-REFERENCE TO RELATED APPLICATION

This application claims priority to and the benefit of Korean Patent Application No. 10-2014-0172126 filed in the Korean Intellectual Property Office on Dec. 3, 2014, the entire contents of which are incorporated herein by reference.

BACKGROUND OF THE DISCLOSURE (a) Technical Field

The present disclosure relates generally to an environmentally friendly vehicle, and more particularly, to a motor coupling device which connects a drivetrain of a hybrid vehicle to a motor, and transfers a driving torque of the motor to the drivetrain.

(b) Description of the Related Art

In general, environmentally-friendly vehicles such as a hybrid vehicle or an electric vehicle may generate a driving torque by an electric motor (hereinafter referred to as "drive motor") for obtaining a rotating force based on electrical energy. For example, a hybrid vehicle runs in an electric vehicle (EV) mode that is a pure electric mode using only power of a drive motor or runs in a hybrid electric vehicle (HEV) mode using driving both torques of an engine and the drive motor as power. Further, an electric vehicle runs by only using a torque of the drive motor as power.

The drive motor may be connected to a drivetrain of the vehicle, e.g., a double clutch transmission (DCT). The drive motor is connected to the drivetrain through a coupling, the coupling is connected to the drive motor, and is connected to a coupling plate of the drivetrain by engagement of a gear form so that a driving torque of the drive motor may be transferred to the drivetrain.

However, in conventional systems, when rotation angular acceleration of the driver motor is changed (e.g., upon regenerative braking) while a driving torque of the drive motor is transferred to the drivetrain through a coupling, a nonlinear behavior may be generated due to an inertia difference between the drive motor and the drivetrain. When a direction of the driving torque is changed, impact or excessive noise or vibration may be generated.

In order to solve these problems, conventional systems apply control by reducing a torque change rate around backlash generation or applying an additional damping element. However, such systems rely on backlash through a proper mechanical design of an element to fundamentally connect the drive motor to the drivetrain such as through a coupling.

The above information disclosed in this Background section is only for enhancement of understanding of the background of the disclosure and therefore it may contain information that does not form the related art that is already known in this country to a person of ordinary skill in the art.

SUMMARY OF THE DISCLOSURE

The present disclosure has been made in an effort to provide a motor coupling device having advantages of connecting a drivetrain of a hybrid vehicle to a drive motor, and compensating for backlash generated upon change of a direction of a driving torque by a simple configuration. Embodiments of the present disclosure provide a motor coupling device for connecting a drivetrain of a hybrid vehicle to a motor and transferring a driving torque of the motor to the drivetrain, the motor coupling device including: a coupling plate connected to a rotation shaft of the motor and engaging with a connecting plate of the drivetrain; and a first backlash compensation unit installed at one surface of the coupling plate, interfering with the connecting plate, and compensating for backlash when a motor reverse torque is generated.

The first backlash compensation unit may include: a first plate rotatably installed at the one surface of the coupling plate at a predetermined rotation angle, a portion of the first plate making contact with the connecting plate; and at least one first spring having one end supported at the coupling plate between the coupling plate and the first plate and an opposite end supported at the first plate.

First mounting grooves for mounting the at least one first spring may be formed at the one surface of the coupling plate and a surface of the first plate opposite to the one surface of the coupling plate, respectively.

At least one first contact protrusion may make contact with the connecting plate may be formed in the first plate.

The coupling plate may include coupling teeth engaging with connecting teeth of the connecting plate, the coupling teeth may make contact with one side of the connecting teeth when a motor forward torque is input and engage with the connecting teeth while forming a predetermined gap between the coupling teeth and another side of the connecting teeth, the at least one first contact protrusion may make contact with the other side of the connecting teeth.

The first plate may be rotated in one direction by a predetermined rotation angle when a reverse torque is generated during motor forward torque drive, and the at least one first spring may be compressed between the coupling plate and the first plate by the first plate and provide an elastic force to the connecting plate.

The coupling teeth may make contact with the other side of the connecting teeth and engage with the connecting teeth while forming a predetermined gap between the coupling teeth and the one side of the connecting teeth, and the at least one first contact protrusion may make contact with the other side of the connecting teeth.

Furthermore, according to embodiments of the present disclosure, a motor coupling device for connecting a drivetrain of a hybrid vehicle to a motor and transferring a driving torque of the motor to the drivetrain includes: a coupling plate connected to a rotation shaft of the motor and engaging with a connecting plate of the drivetrain; a first backlash compensation unit installed at one surface of the coupling plate, interfering with the connecting plate, and compensating for backlash when a motor reverse torque is generated; and a second backlash compensation unit installed at an opposite surface of the coupling plate, interfering with the connecting plate, and compensating for backlash when a motor forward torque is applied.

The first backlash compensation unit may include: a first plate rotatably installed at the one surface of the coupling plate at a predetermined rotation angle, a portion of the first plate making contact with the connecting plate; and at least one first spring having one end supported at the coupling plate between the coupling plate and the first plate and an opposite end supported at the first plate.

First mounting grooves for mounting the at least one first spring may be formed at the one surface of the coupling plate and a surface of the first plate opposite to the one surface of the coupling plate, respectively.

At least one first contact protrusion may make contact with the connecting plate may be formed in the first plate.

The coupling plate may include coupling teeth engaging with connecting teeth of the connecting plate, the coupling teeth may make contact with one side of the connecting teeth when a motor forward torque is input and engage with the connecting teeth while forming a predetermined gap between the coupling teeth and another side of the connecting teeth, and the at least one first contact protrusion may make contact with the other side of the connecting teeth.

The first plate may be rotated in one direction by a predetermined rotation angle when a reverse torque is generated during motor forward torque drive, and the at least one first spring may be compressed between the coupling plate and the first plate by the first plate and provide an elastic force to the connecting plate.

The coupling teeth may make contact with another side of the connecting teeth and engage with the connecting teeth while forming a predetermined gap between the coupling teeth and the one side of the connecting teeth, and the at least one first contact protrusion may make contact with the other side of the connecting teeth.

The second backlash compensation unit may include: a second plate rotatably installed at an opposite surface of the coupling plate at a predetermined rotation angle, a portion of the second plate making contact with the connecting plate; and at least one second spring having one end supported at the coupling plate between the coupling plate and the second plate and an opposite end supported at the second plate.

Second mounting grooves for mounting the at least one second spring may be formed at the opposite surface of the coupling plate and a surface of the second plate opposite to the opposite surface of the coupling plate, respectively.

At least one second contact protrusion may make contact with the connecting plate may be formed in the second plate.

The second plate may be rotated in another direction by a predetermined rotation angle when a forward torque is applied during motor reverse torque drive, and the at least one second spring may be compressed between the coupling plate and the first plate by the second plate and provide an elastic force to the connecting plate.

The coupling plate may include coupling teeth engaging with the connecting teeth of the connecting plate, the coupling teeth may make contact with one side of the connecting teeth and engage with the connecting teeth while forming a predetermined gap between the coupling teeth and another side of the connecting teeth, and the at least one second contact protrusion may make contact with the one side of the connecting teeth.

The motor coupling device may connect a double clutch transmission as the drivetrain to the motor and transfer a driving torque of the motor to the double clutch transmission.

Accordingly, embodiments of the present disclosure may reduce impact or excessive noise and vibration due to motor bi-direction (+)(−) backlash and may smoothly transmit power between the motor and the drivetrain by compensating for the bi-direction (+)(−) backlash of a motor through first and second backlash compensation units having a simple configuration.

BRIEF DESCRIPTION OF THE DRAWINGS

In the following detailed description, only certain embodiments of the present disclosure have been shown and described, simply by way of illustration.

DETAILED DESCRIPTION OF THE EMBODIMENTS

Figure 1:
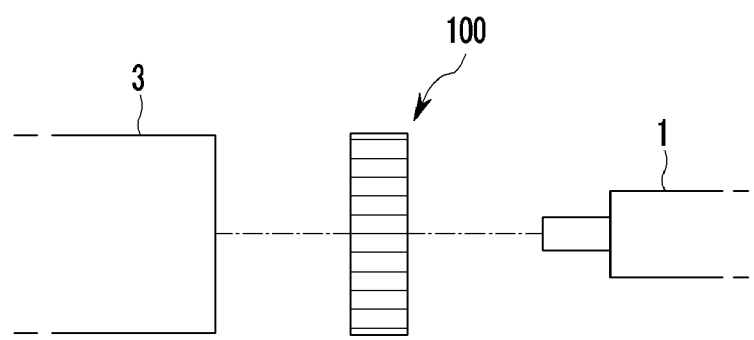
FIG. 1 is a block diagram illustrating an example of a motor coupling device in accordance with embodiments of the present disclosure.

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

Parts irrelevant to the description are omitted to clearly illustrate the present disclosure, and like reference numbers designate like constituent elements through the specification. Further, the size and thickness of each configuration shown in the drawings are arbitrarily illustrated for better understanding and ease of description, so the present disclosure is not limited to shown drawings, and thicknesses are exaggerated for clarity of a plurality of parts and regions.

In the following detailed description, the terms "first" and "second" will be used to discriminate one component from another component, but the components may not be limited to the above terms. In addition, unless explicitly described to the contrary, the word "comprise" and variations such as "comprises" or "comprising" will be understood to imply the inclusion of stated elements but not the exclusion of any other elements. Also, the suffixes "~ unit", "~ means", "~ part", and "~ member" mean a unit of a general configuration to perform at least one function or operation.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Referring now to the disclosed embodiments, FIG. 1 is a block diagram illustrating an example of a motor coupling device in accordance with embodiments of the present disclosure.

As shown in FIG. 1, the motor coupling device 100 is applicable to an environmentally friendly vehicle such as an electric vehicle or a hybrid vehicle using a drive motor 1 for generating a driving torque based on electrical energy. For example, the motor coupling device 100 is applied to a hybrid vehicle and connects a drivetrain 3 of the vehicle to the drive motor 1, and transfers a driving torque of the drive motor 1 to the drivetrain 3. Further, the motor coupling device 100 connects the drive motor 1 to a double clutch transmission (DCT) being the drivetrain 3 of the hybrid vehicle and may transfer a driving torque of the drive motor 1 to the DCT.

Hereinafter, a configuration of the motor coupling device 100 will be described as an example of a power transmission device for connecting the drive motor 1 to the DCT being the drivetrain 3 of the hybrid vehicle. However, the scope of the present disclosure is not limited to the motor coupling device for connecting the drive motor 1 to the drivetrain 3 of the hybrid vehicle. That is, the motor coupling device 100 may be configured in any suitable manner as would be understood by a person of ordinary skill in the art.

Illustratively, the motor coupling device 100 is connected to a rotation shaft of the drive motor 1 by a connecting plate 5 (e.g., see FIG. 4) of the drivetrain 3 and engagement of a gear form. In this case, the connecting plate 5 is formed therein with connecting teeth 7 (e.g., see FIG. 4) which may engage with the motor coupling device 100.

The motor coupling device 100 connects the drive motor 1 to the drivetrain 3 of the hybrid vehicle, and may compensate for backlash generated upon change in a direction of the driving torque by a simple configuration. That is, embodiments of the present disclosure provide a motor coupling device capable of reducing impact or excessive noise and vibration due to backlash by compensating for motor bi-direction (e.g., forward direction and reverse direction) backlash. Furthermore, embodiments of the present disclosure may provide a motor coupling device that compensates for backlash when a reverse (−) torque is generated (e.g., upon regenerative braking) during motor forward (+) torque drive and may compensate for backlash when the forward (+) torque is applied (e.g., upon vehicle acceleration) during reverse (−) torque drive.

Figure 2A:
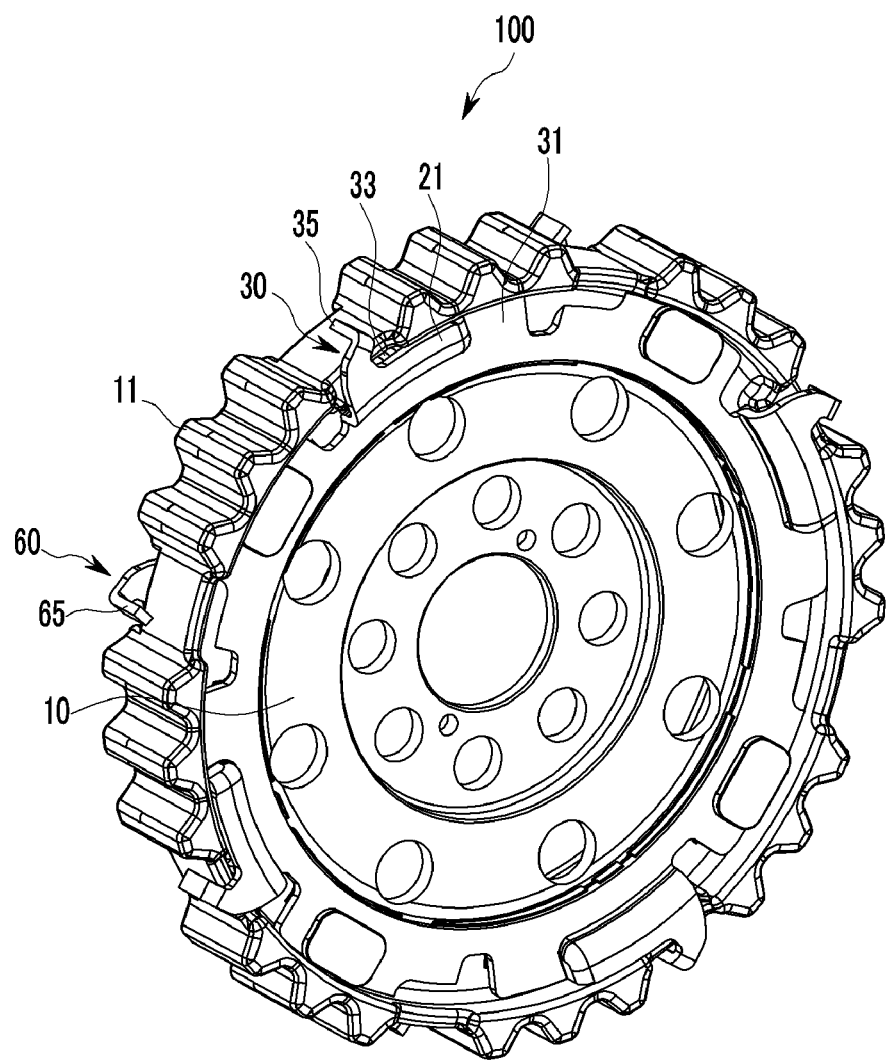
FIG. 2A and FIG. 2B are a perspective front view and a perspective rear view illustrating the motor coupling device in accordance with embodiments of the present disclosure, respectively.
Figure 2B:
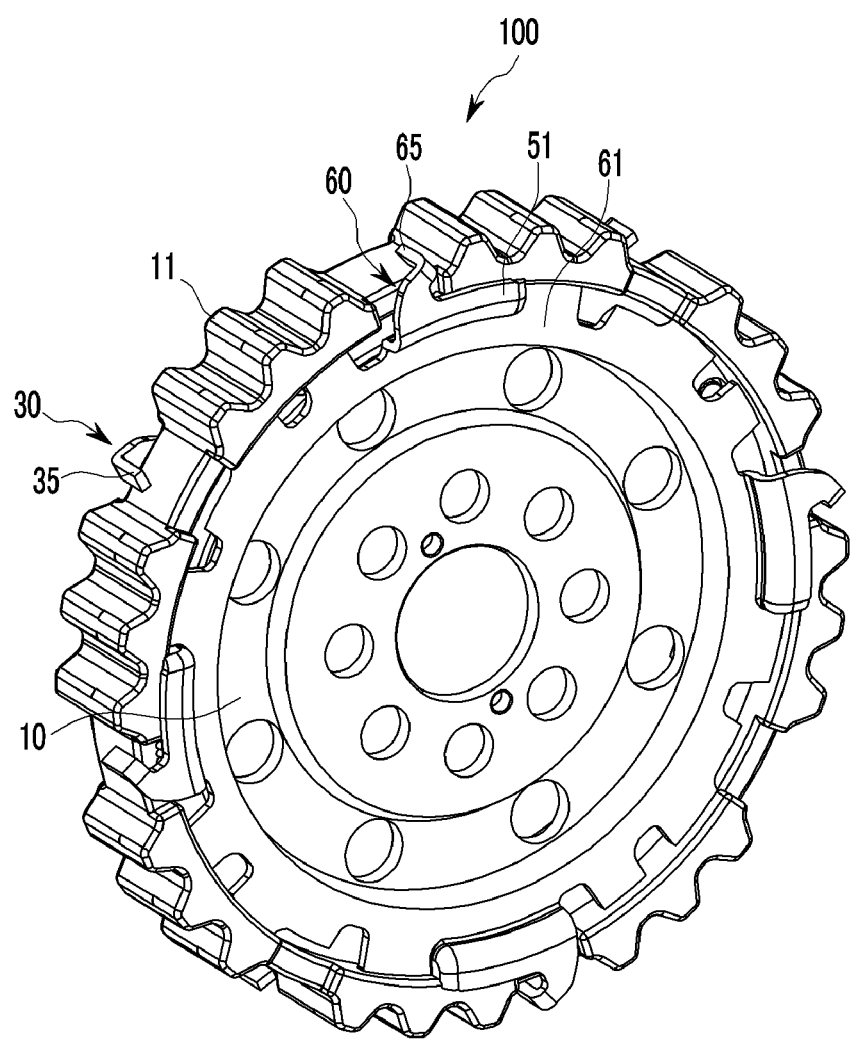
Figure 3A:
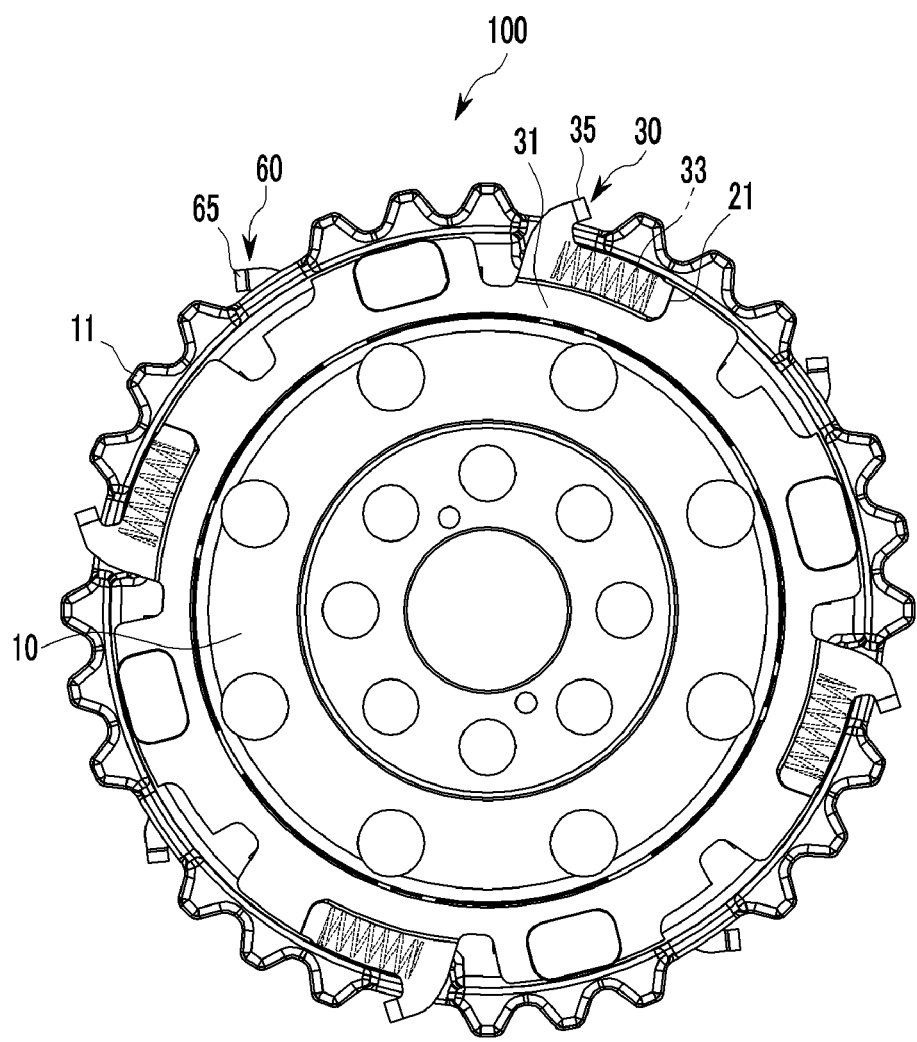
FIG. 3A and FIG. 3B are a perspective front view and a perspective rear view illustrating the motor coupling device in accordance with embodiments of the present disclosure, respectively.
Figure 3B:
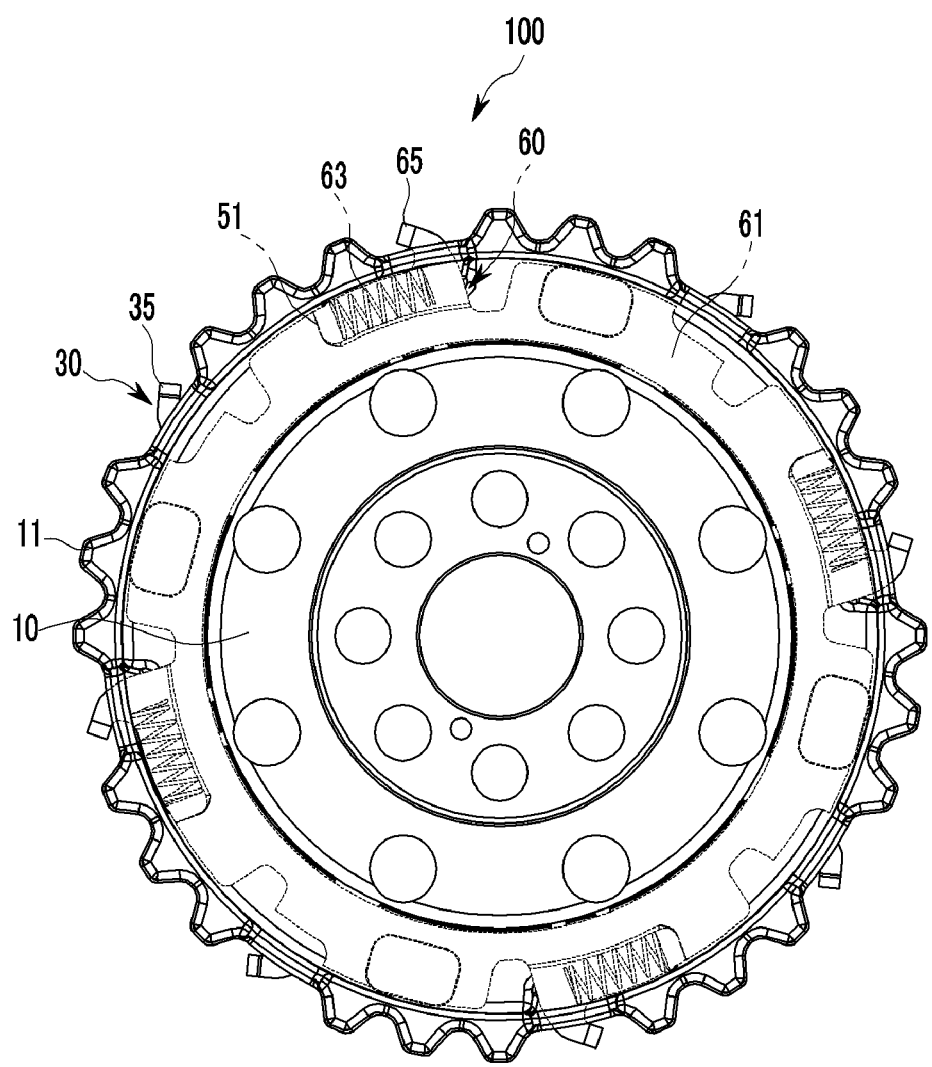

FIG. 2A and FIG. 2B are a perspective front view and a perspective rear view illustrating the motor coupling device in accordance with embodiments of the present disclosure, respectively, and FIG. 3A and FIG. 3B are a perspective front view and a perspective rear view illustrating the motor coupling device in accordance with embodiments of the present disclosure, respectively.

As shown in FIG. 2A and FIG. 3B, the motor coupling device 100 includes a coupling plate 10, a first backlash compensation unit 30, and a second backlash compensation unit 60.

The coupling plate 10 is connected to a rotation shaft of the drive motor 1 (hereinafter referred to as "motor" for convenience). The coupling plate 10 engages with the connecting plate 5 of the drivetrain 3. Accordingly, the coupling plate 10 is formed therein with coupling teeth 11 engaging with connecting teeth 7 of the connecting plate 5 as described above.

The first backlash compensation unit 30 absorbs impact due to backlash caused upon generation of reverse (−) torque during motor forward (+) torque drive, for example, upon regenerative braking of the hybrid vehicle. Upon motor forward (+) torque input, the coupling teeth 11 of the coupling plate 10 may make contact with one side of the connecting teeth 7 as shown in FIG. 4, and may engage with the connecting teeth 7 while forming a predetermined gap (i.e., tolerance) between the coupling teeth 11 and another side of the connecting teeth 7.

Figure 4:
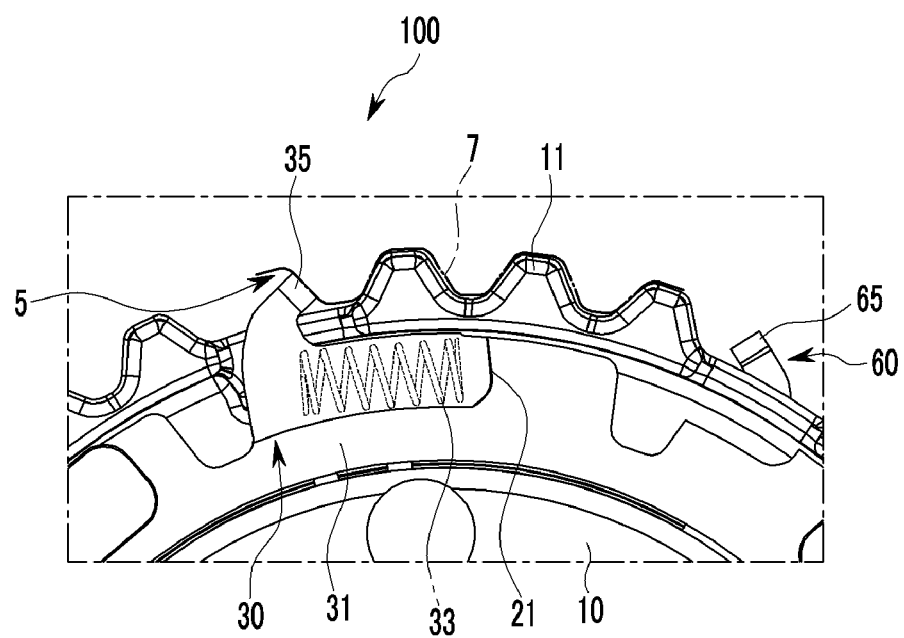
FIG. 4 is a view illustrating a first backlash compensation unit of the motor coupling device in accordance with embodiments of the present disclosure.

Referring to FIG. 4 together with FIG. 2A to FIG. 3B, a configuration of the first backlash compensation unit 30 is illustrated. The first backlash compensation unit 30 is provided at one side of the coupling plate 10, i.e., a front surface of the coupling plate 10, as illustrated in FIG. 2A and FIG. 3A, and may be installed to interfere with the connecting plate 5 of the drivetrain 3. The first backlash compensation unit 30 includes a first plate 31 and a first spring 33.

The first plate 31 has a disk shape, and is rotatably installed at one surface of the coupling plate 10 at a predetermined rotation angle. Further, a portion of the first plate 31 makes contact with the connecting teeth 7 of the connecting plate 5. A contact structure of the connecting plate 5 of the first plate 31 will be described below together with a mounting structure of the first spring 33.

The first spring 33 compensates for backlash through spring stiffness when the reverse (−) torque is generated during motor forward (+) torque drive, and is installed between the coupling plate 10 and the first plate 31. A plurality of first springs 33 are spaced apart from each other by a predetermined interval between the coupling plate 10 and the first plate 31. One end of the first spring 33 is supported at the coupling plate 10, and an opposite end of the first spring 33 is supported at the first plate 31.

To this end, first mounting grooves 21 for mounting the first spring 33 are formed at one surface of the coupling plate 10 and an opposite surface of the first plate 31 opposite to the one surface of the coupling plate 10, respectively. The first mounting groove 21 formed at the coupling plate 10 is recessed in one surface of the coupling plate 10. The first mounting groove 21 formed at the first plate 31 is recessed in an opposite surface of the first plate 31 opposite to the one surface of the coupling plate 10 and protrudes in a forward direction of the coupling plate 10. As described above, a portion of the first plate 31 makes contact with the connecting teeth 7 of the connecting plate 5. The first plate 31 is integrally formed with at least one first contact protrusion 35 making contact with the connecting plate 5.

A plurality of first contact protrusions 35 are integrally connected to a formation portion of the first mounting groove 21 of the first plate 31 and extend between coupling teeth 11 of the coupling plate 10. In addition, the first contact protrusion 35 extends between coupling teeth 7 of the coupling plate 10 and makes contact with another side of the connecting teeth 7 of the connecting plate 5. For example, when the forward (+) torque is applied during the motor reverse (−) torque drive, the second backlash compensation unit 60 compensates for backlash generated upon accelerating the vehicle to absorb the impact due to the backlash.

Figure 5:
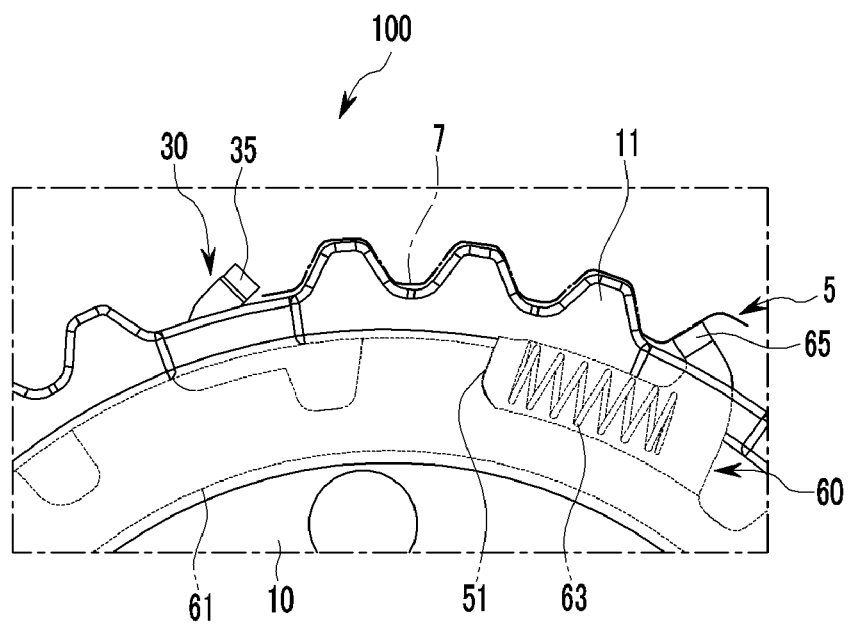
FIG. 5 is a view illustrating a second backlash compensation unit of the motor coupling device in accordance with embodiments of the present disclosure.

Referring to FIG. 5 together with FIG. 2A to FIG. 3B, a configuration of the second backlash compensation unit 60 is described. The second backlash compensation unit 60 is provided at an opposite surface of the coupling plate 10, i.e., a rear surface of the coupling plate 10, as illustrated in FIG. 2A and FIG. 3A, and may be installed to interfere with the connecting plate 5. The second backlash compensation unit 60 includes a second plate 61 and a second spring 63.

The second plate 61 has a disk shape, and is rotatably installed at an opposite surface of the coupling plate 10 at a predetermined rotation angle. Further, a portion of the second plate 61 makes contact with connecting teeth 7 of the connecting plate 5. A contact structure of the connecting plate 5 of the second plate 61 will be described later together with a mounting structure of the second spring 63.

The second spring 63 compensates for backlash through spring stiffness when the forward (+) torque is generated during motor reverse (−) torque drive, and is installed between the coupling plate 10 and the second plate 61. A plurality of second springs 63 are spaced apart from each other by a predetermined interval between the coupling plate 10 and the second plate 61. One end of the second spring 63 is supported at the coupling plate 10, and an opposite end of the second spring 63 is supported at the second plate 61.

To this end, second mounting grooves 51 for mounting the second spring 63 are formed at one surface of the coupling plate 10 and an opposite surface of the second plate 61 opposite to the one surface of the coupling plate 10, respectively. The second mounting groove 51 formed at the coupling plate 10 is recessed in one surface of the coupling plate 10. The second mounting groove 51 formed at the second plate 61 is recessed in an opposite surface of the second plate 61 opposite to the one surface of the coupling plate 10, and protrudes in a reward direction of the coupling plate 10.

As described above, a portion of the second plate 61 makes contact with the connecting teeth 7 of the connecting plate 5. The second plate 61 is integrally formed with at least one second contact protrusion 65 making contact with the connecting plate 5. A plurality of second contact protrusions 65 are integrally connected to a formation portion of the second mounting groove 51 of the second plate 61, and extend between coupling teeth 11 of the coupling plate 10. In addition, the second contact protrusion 65 extends between coupling teeth 11 of the coupling plate 10, and makes contact with one side of the connecting teeth 7 of the connecting plate 5.

Hereinafter, an operation of the motor coupling device 100 in accordance with embodiments of the present disclosure configured as above will be described in detail with reference to the accompanying drawings.

First, in the motor coupling device 100, a drivetrain 3 such as a double clutch transmission of a hybrid vehicle is connected to a rotation shaft of a motor 1, and a driving torque of the motor 1 is transferred to the drivetrain 3. A coupling plate 10 of the motor coupling device 100 engages with a connecting plate 5 of the drivetrain 3 while being connected to the rotation shaft of the motor 1, and coupling teeth 11 of the coupling plate 10 engage with the connecting teeth 7 of the connecting plate 5.

As described above, upon motor forward (+) torque input while transferring the driving torque of the motor 1 to the connecting plate 5 through the coupling plate 10, the coupling teeth 11 of the coupling plate 10 make contact with one side of the connecting teeth 7, as shown in FIG. 4, and engage with the connecting teeth 7 while forming a predetermined gap (i.e., tolerance) between the coupling teeth 11 and another side of the connecting teeth 7. A first contact protrusion 35 of a first plate 31 of a first backlash compensation unit 30 makes contact with the other side of the connecting teeth 7, and a first spring 33 of the first backlash compensation unit 30 does not represent an elastic force. In addition, a second contact protrusion 65 of a second plate 61 of a second backlash compensation unit 60 makes contact with one side of the connecting teeth 7, and a second spring 63 of the second backlash compensation unit 60 does not represent the elastic force.

Meanwhile, the first and second springs 33 and 63 of the first and second backlash compensation units 30 and 60 represent stiffness of 8.86 NM/deg, and the motor 1 represents shaft distortion stiffness of 483.878 NM/deg. In this state, for example, when a reverse (−) torque is generated during motor forward (+) torque drive upon regenerative braking of the hybrid vehicle, non-linear action is generated due to an inertia difference between the coupling plate 10 and the connecting plate 5, and backlash is generated due to change in a direction of the driving torque.

Figure 6:
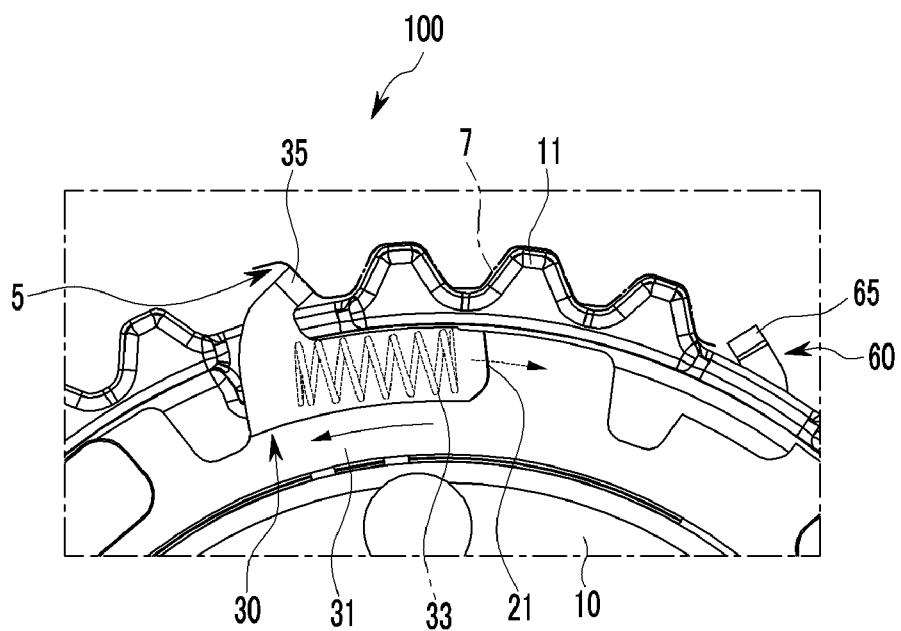
FIG. 6 is a view illustrating an operation of the first backlash compensation unit of the motor coupling device in accordance with embodiments of the present disclosure.

As described above, since the first contact protrusion 35 of the first plate 31 makes contact with the other side of the connecting teeth 7, as shown in FIG. 6, the first plate 31 is rotated in one direction by a predetermined rotation angle (e.g., a backlash compensation angle of 0.65°) due to an inertial force of the connecting plate 5. That is, the first plate 31 is rotated in one direction by a gap between the coupling teeth 11 of the coupling plate 10 and other side of the connecting teeth 7.

Accordingly, the first spring 33 is compressed between the coupling plate 10 and the first plate 31 by the first plate 31. The first spring 33 may compensate for backlash of reverse (−) torque generation with spring stiffness of 8.86 NM/deg by providing the generated elastic force (i.e., spring stiffness) to the connecting plate 5. When the first plate 31 is rotated, the coupling teeth 11 of the plate 10 make contact with the other side of the connecting teeth 7 while forming a predetermined gap between the one side of the connecting teeth 7 and the other side of the connecting teeth 7. Further, the first contact protrusion 35 of the first plate 31 makes contact with the other side of the connecting teeth 7.

Accordingly, embodiments of the present disclosure may reduce impact or excessive noise and vibration due to the backlash by compensating for the backlash through the first backlash compensation unit 30 when the reverse (−) torque is generated during motor forward (+) torque drive. For example, the non-linear action is generated due to an inertia difference between the coupling plate 10 and the connecting plate 5 by applying a forward (+) torque during motor reverse (−) torque drive upon vehicle acceleration during regenerative braking of the hybrid vehicle, and the backlash is generated due to a change in the direction of the driving torque.

Figure 7:
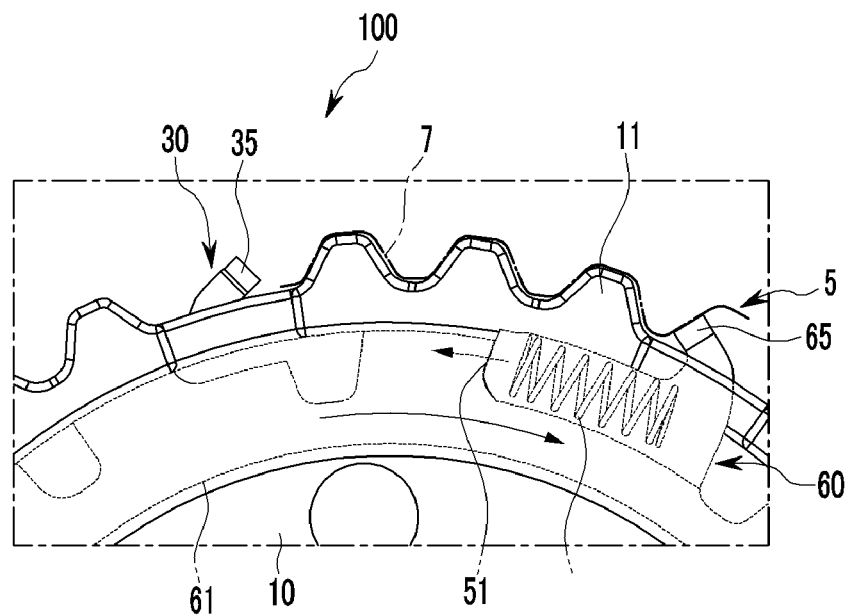
FIG. 7 is a view illustrating an operation of the second backlash compensation unit of the motor coupling device in accordance with embodiments of the present disclosure.

As described above, since the second contact protrusion 65 of the second plate 61 makes contact with one side of the connecting teeth 7 of the connecting plate 5, the second plate 61 is rotated in another direction by a predetermined rotation angle (for example, a backlash compensation angle of 0.65°) due to an inertial force of the connecting plate 5, as shown in FIG. 7. That is, the second plate 61 is rotated in another direction by a gap formed between one side the coupling teeth 11 of the coupling plate 10 and one side of the connecting teeth 7. Accordingly, the second spring 63 is compressed between the coupling plate 10 and the second plate 61 by the second plate 61. The second spring 63 may compensate for the backlash of forward (+) torque applied during motor reverse (−) torque drive with spring stiffness of 8.86 NM/deg by providing the generated elastic force (i.e., spring stiffness) to the connecting plate 5.

When the second plate 61 is rotated, the coupling teeth 11 of the plate 10 make contact with the other side of the connecting teeth 7 while forming a predetermined gap between the one side of the connecting teeth 7 and the other side of the connecting teeth 7. Further, the second contact protrusion 65 of the second plate 31 makes contact with the one side of the connecting teeth 7. Accordingly, embodiments of the present disclosure may reduce impact or excessive noise and vibration due to the backlash by compensating for the backlash through the second backlash compensation unit 60 when the forward (+) torque is applied during motor reverse (−) torque drive.

Figure 8:
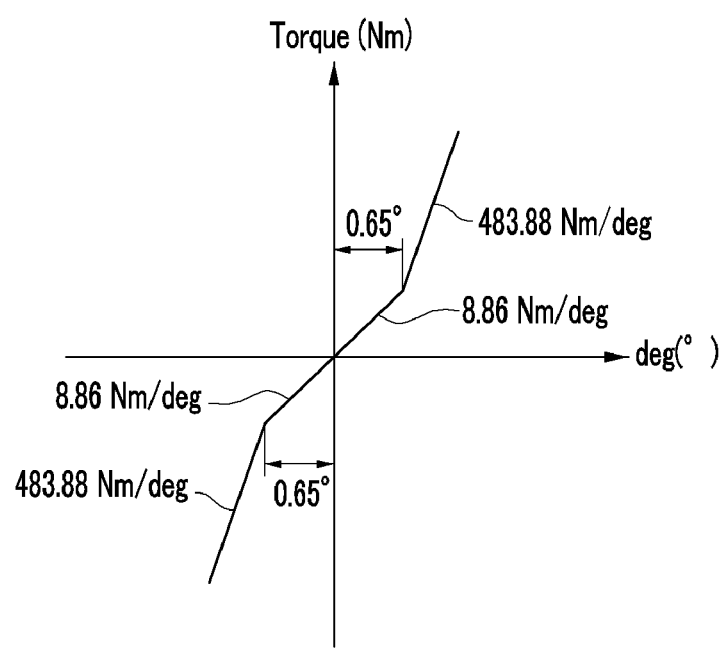
FIG. 8 is a graph illustrating operational effects of the motor coupling in accordance with embodiments of the present disclosure.

In accordance with the motor coupling device 100, as shown in FIG. 8, when a reverse (−) torque is generated during motor forward (+) torque drive, the backlash is compensated with spring stiffness of 8.86 NM/deg to 0.65° by the first backlash compensation unit 30, and the motor 1 represents shaft distortion stiffness of 483.878 NM/deg afterward. In addition, when a forward (+) torque is applied during motor reverse (−) drive, the backlash is compensated to 0.65° with the spring stiffness of 8.86 NM/deg by the second backlash compensation unit 60, and the motor 1 represents the shaft distortion stiffness of 483.878 NM/deg afterwards. Accordingly, impact or excessive noise and vibration due to bi-direction backlash may be reduced and power may be smoothly transmitted between the motor 1 and the drivetrain 3 by compensating for motor bi-direction (+) (−) backlash through the first and second backlash compensation units 30 and 60.

Embodiments of the present disclosure are disclosed herein, but the present disclosure is not limited to the disclosed embodiments. On the contrary, the present disclosure is intended to cover various modifications and equivalent arrangements included within the appended claims and the detailed description and the accompanying drawings of the present disclosure.

| <Description of symbols> | |
|---|---|
| 1 . . . drive motor | 3 . . . drivetrain |
| 5 . . . connecting plate | 7 . . . connecting teeth |
| 10 . . . coupling plate | 11 . . . coupling teeth |
| 21 . . . first mounting groove | 30 . . . first backlash compensation unit |
| 31 . . . first plate | 33 . . . first spring |
| 35 . . . first contact protrusion | 51 . . . second mounting groove |
| 60 . . . second backlash compensation unit | 61 . . . second plate |
| 63 . . . second spring | 65 . . . second contact protrusion |

What is claimed is:

1. A motor coupling device for connecting a drivetrain of a hybrid vehicle to a motor and transferring a driving torque of the motor to the drivetrain, the motor coupling device comprising:
    a coupling plate adaptive to be connected to the motor and to be engaged with a connecting plate of the drivetrain;
    a first backlash compensation unit installed at one surface of the coupling plate, being adaptive to interfere with the drivetrain, and compensating for backlash when a motor reverse torque is generated; and
    a second backlash compensation unit installed at an opposite surface of the coupling plate, being adaptive to interfere with the drivetrain, and compensating for backlash when a motor forward torque is applied.

2. The motor coupling device of claim 1, wherein the first backlash compensation unit includes:
    a first plate rotatably installed at the one surface of the coupling plate at a predetermined rotation angle, a portion of the first plate being adaptive to receive the motor reverse torque; and
    at least one first spring having one end supported at the coupling plate between the coupling plate and the first plate and an opposite end supported at the first plate.

3. The motor coupling device of claim 2, wherein first mounting grooves for mounting the at least one first spring are formed at the one surface of the coupling plate and a surface of the first plate opposite to the one surface of the coupling plate, respectively.

4. The motor coupling device of claim 2, wherein at least one first contact protrusion is formed in the first plate to receive the motor reverse torque.

5. The motor coupling device of claim 4, wherein:
    the coupling plate includes coupling teeth adaptive to be engaged with the drivetrain,
    the coupling teeth make contact with one side of the connecting teeth when a motor forward torque is input and engage with the connecting teeth while forming a predetermined gap between the coupling teeth and another side of the connecting teeth, and
    the at least one first contact protrusion makes contact with the other side of the connecting teeth.

6. The motor coupling device of claim 5, wherein:
    the first plate is rotated in one direction by a predetermined rotation angle when a reverse torque is generated during motor forward torque drive, and
    the at least one first spring is compressed between the coupling plate and the first plate by the first plate and provides an elastic force.

7. The motor coupling device of claim 6, wherein:
    the coupling teeth make contact with another side of the connecting teeth and engage with the connecting teeth while forming a predetermined gap between the coupling teeth and the one side of the connecting teeth, and
    the at least one first contact protrusion makes contact with the other side of the connecting teeth.

8. The motor coupling device of claim 2, wherein the second backlash compensation unit includes:
    a second plate rotatably installed at an opposite surface of the coupling plate at a predetermined rotation angle, a portion of the second plate being adaptive to receive the motor forward torque; and
    at least one second spring having one end supported at the coupling plate between the coupling plate and the second plate and an opposite end supported at the second plate.

9. The motor coupling device of claim 8, wherein second mounting grooves for mounting the at least one second spring are formed at the opposite surface of the coupling plate and a surface of the second plate opposite to the opposite surface of the coupling plate, respectively.

10. The motor coupling device of claim 8, wherein at least one second contact protrusion is formed in the second plate to receive the motor forward torque.

11. The motor coupling device of claim 10, wherein:
    the second plate is rotated in another direction by a predetermined rotation angle when a forward torque is applied during motor reverse torque drive, and
    the at least one second spring is compressed between the coupling plate and the first plate by the second plate and provides an elastic force.

12. The motor coupling device of claim 11, wherein:
    the coupling plate includes coupling teeth adaptive to be engaged with the connecting plate,
    the coupling teeth make contact with one side of the connecting teeth and engage with the connecting teeth while forming a predetermined gap between the coupling teeth and another side of the connecting teeth, and
    the at least one second contact protrusion makes contact with the one side of the connecting teeth.

* * * * *